June 20, 1967  S. S. McINTYRE, JR  3,326,528
CABLE STRINGING AND TENSIONING SYSTEM
Filed June 15, 1964  3 Sheets-Sheet 1
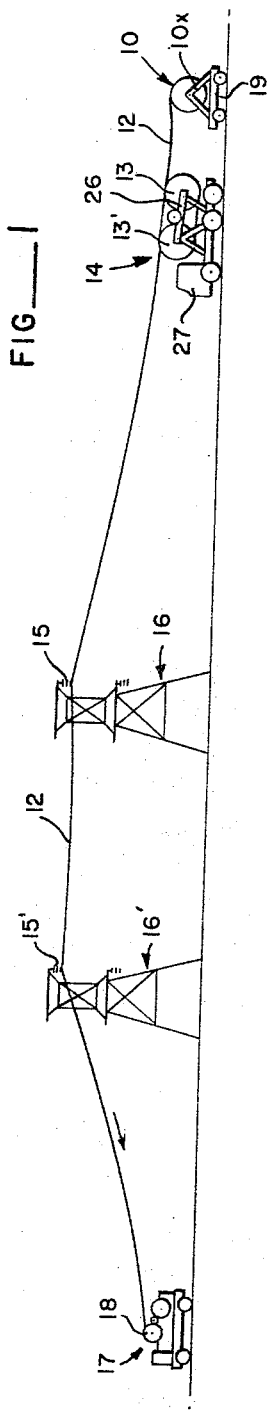
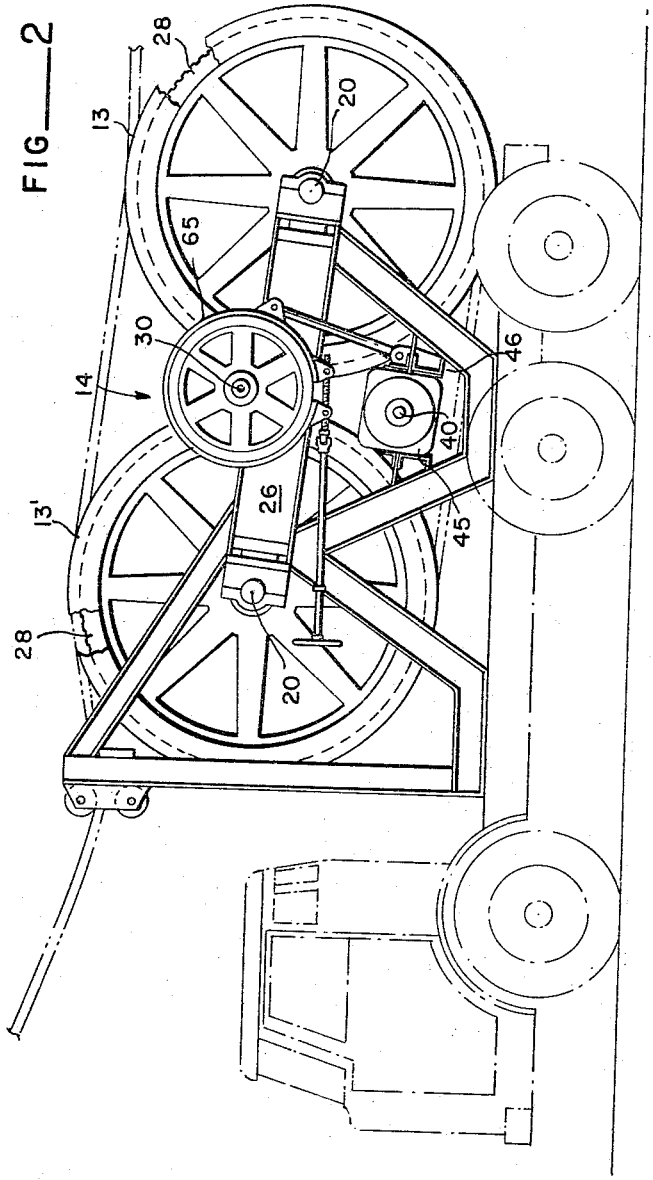
SIDNEY S. MCINTYRE JR.
INVENTOR.
BY *Seed & Berry*
ATTORNEYS

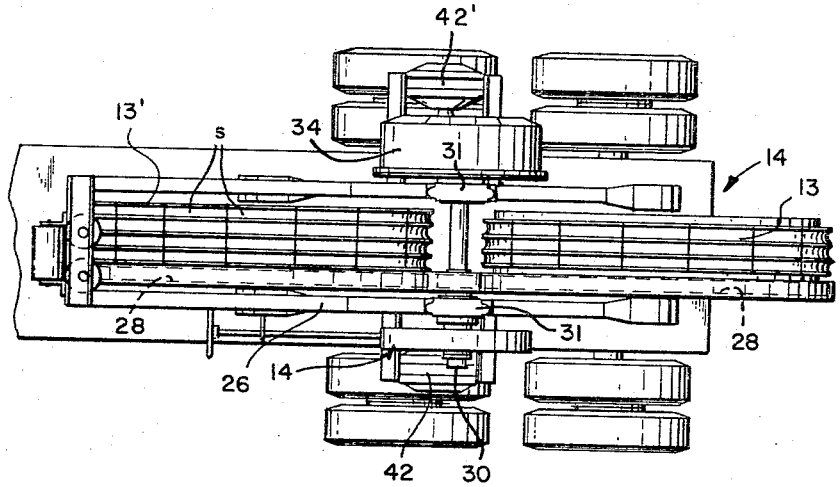
FIG___3
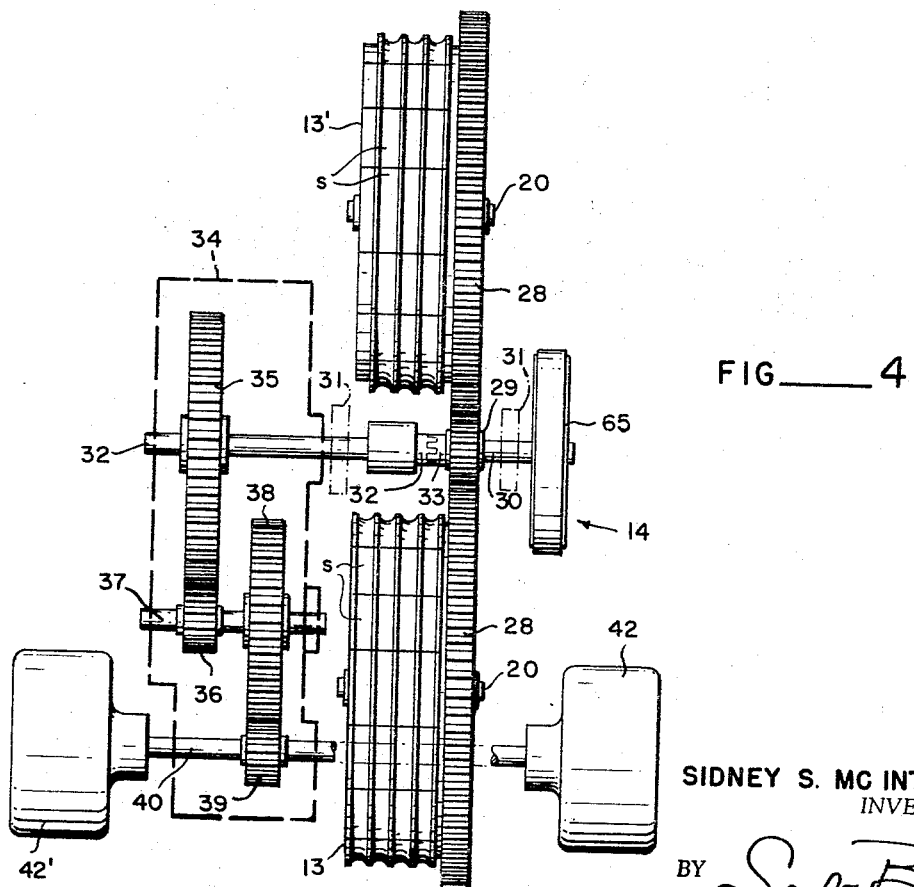
FIG___4

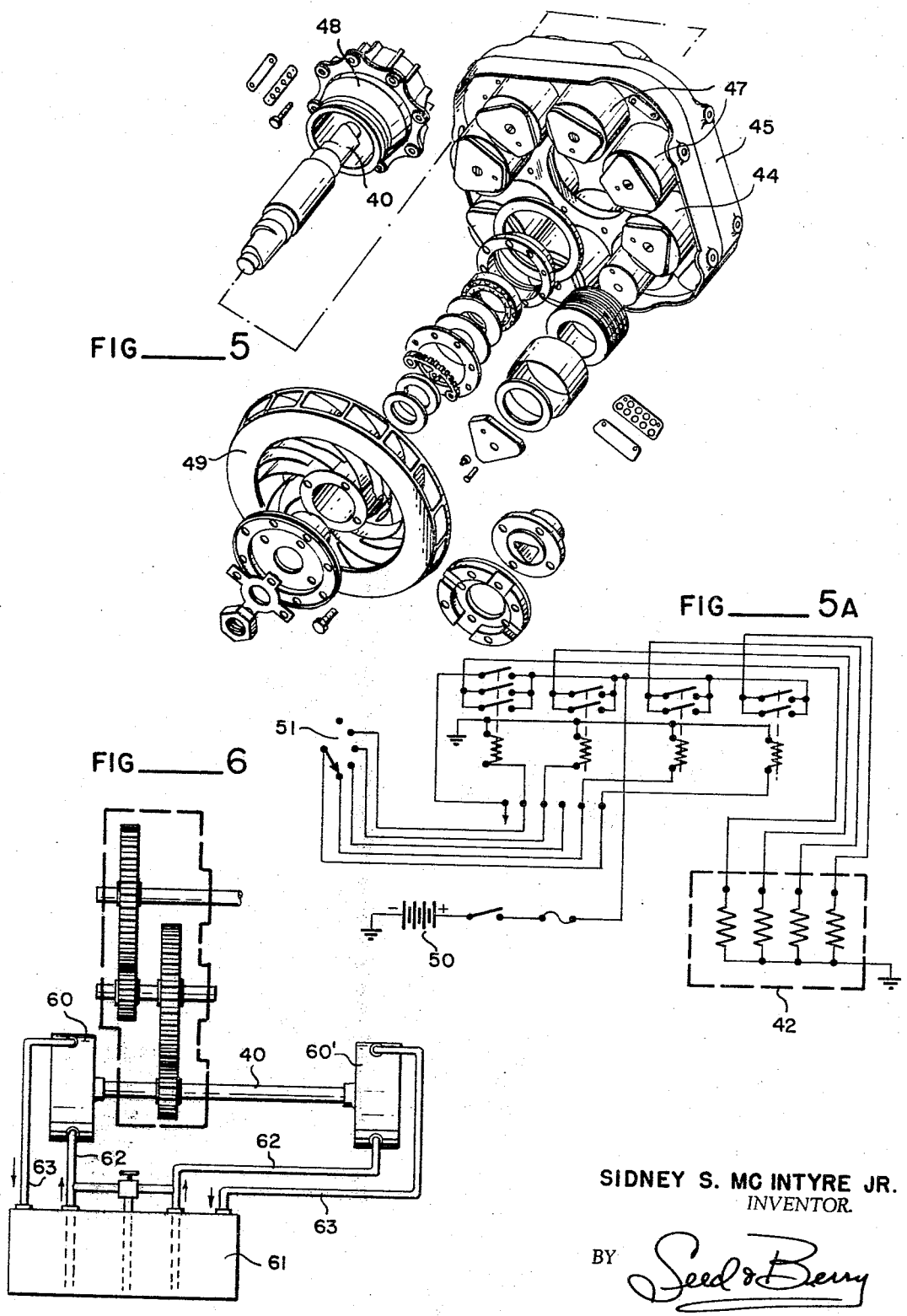

United States Patent Office 3,326,528
Patented June 20, 1967

3,326,528
CABLE STRINGING AND TENSIONING SYSTEM
Sidney S. McIntyre, Jr., Box 151,
Sedro Woolley, Wash. 98284
Filed June 15, 1964, Ser. No. 375,090
7 Claims. (Cl. 254—134.3)

This invention relates to improvements in cable stringing means. More specifically, it relates to tension producing means as used in association with equipment, employed for the stringing or drawing of power transmission lines or cables between towers, poles or supports that are spaced at substantial intervals, such as for example, from one fourth to a half mile or more; the present tensioning means being designed to subject the cable, as drawn out from a reel, spool or other source of supply, to controlled retarding of such amount that it will not be allowed to sag under its own weight to any extent that would permit it to contact with or drag across intervening surfaces or objects between successive points of its support; by means of special retarders, in lieu of the friction brakes.

Explanatory to this invention, it will here be stated that high voltage power transmission lines are frequently strung through rough and mountainous terrain in remote areas and are supported at relatively high elevations above ground by towers or the like. Installations of such lines are abnormally high in cost by reason of the requirement for use of cable transporting vehicles of heavy and substantial construction and by reason of the requirements for special equipment for drawing out the cable from its conveying vehicle and for maintaining it under the required tension for surface and other objects clearance while being strung. The value of the high tension cable requires a tension producing device that is not related to the use of friction brakes.

It is the principal object of this invention to provide new and novel tensioning means for use with cable or line stringing equipment of the present character, that may be so regulated as to maintain a desired or required tension on the transmission cable as drawn out, without unnecessarily adding to the power required for its drawing or stringing between points of support.

A further object of this invention resides in the specific manner of combining electric or hydraulic retarder means with cable stringing equipment of the present character to establish and maintain the desired tension.

Further objects and advantages of the present invention reside in the novel combination of parts employed therein and in the mode of their operation particularly in the direct gearing to the retarder through a disconnecting clutch, as will hereafter be described.

In accomplishing the above mentioned and other objects of the invention, I have provided the improved details of construction, the preferred forms of which are illustrated in the accompanying drawings, wherein:

FIG. 1 is a schematic view illustrating the means for the stringing of a cable under sag preventing tension in accordance with the objects of the present invention.

FIG. 2 is a side view of the vehicle that is equipped with cable tensioning means embodying therein a pair of electric retarders in accordance with the objects and teachings of the invention.

FIG. 3 is a plan view of the cable tensioning vehicle and apparatus shown in FIG. 2.

FIG. 4 is a schematic view showing the train of gears for transmission of retarding force from the electric retarders to the cable feeding reels.

FIG. 5 is an exploded showing of a presently employed electric retarder.

FIG. 5A is a schematic wiring diagram for the retarder of FIG. 5.

FIG. 6 is a schematic showing of the use of hydraulic retarders in the present invention.

Referring more in detail to the drawings:

In FIG. 1, 10 designates a large spool on which a substantial length of power transmission cable 12 is wound up and from which spool the cable, as drawn out, is extended to and wound usually several times, about a pair of tension sustaining sheaves 13 and 13' of the present cable tensioning equipment which as herein been designated in its entirety by reference numeral 13. From the sheaves 13–13' of the tensioning equipment 14, the cable 12 is extended to and over cable supports 15 and 15' of two supporting towers 16 and 16' and from the latter tower is extended to a donkey engine 17, or other powered means supporting and adapted for driving a cable winding reel 18 whereby the cable 12 may be drawn under the required tension from the supply between and held for its fixed securement to and its support by the towers 16 and 16'.

In further explanation of the use of the present cable tensioning means, it will here be stated that it is not unusual that power transmission cable 12 of the character now under consideration may weigh from 5 to 6 pounds per foot of its length and is wound on the spool 10 herein shown it may have a length of up to 10,000 feet and a total weight of up to 30 tons.

The spool 10 as here shown is mounted for axial rotation on a mobile supporting vehicle 19 equipped for being towed to various places of use. The two sheaves 13–13' are mounted for rotation on parallel shafts 20—20 supported by the carrying vehicle 14 which has been shown in enlarged side view in FIG. 2 and in FIG. 3 is seen in plan. Gearing for the driving of the retarders is shown in FIG. 4 and will be presently explained.

Each of the sheaves 13–13' is equipped coaxially and circumferentially thereof with a large ring gear 28 and these ring gears are each in driving mesh with a pinion gear 29 that is fixedly mounted on a shaft 30 that extends horizontally between the two sheaves and is rotatably contained at its opposite ends in bearings 31 that are mounted on the opposite side members of the reel mounting frame structure 26. A jaw clutch 32 is keyed on shaft 30 and this may be shifted by suitable means into and from interengaged driving connection with a complemental clutch jaw 33 that is formed on and which turns with the pinion gear 29.

At one end, the shaft 30 extends through a gear housing 34 that is secured in the frame structure 26. Within this housing 34 the shaft 30 has a gear wheel 35 keyed thereon in mesh with a relatively small diameter pinion gear 36 fixed on a shaft 37 also mounted transversely in housing 34. Fixed on shaft 37 is a gear 38 which is in driving mesh with a relatively small gear wheel 39 that is fixed on a cross-shaft 40 that is rotatably mounted in the housing 34 with its ends extended therethrough and to opposite sides of the sheave mounting frame structure 26 as seen in FIG. 4.

Each of the electric retarders 42 presently being used is as shown in FIG. 5. Each is in effect, a form of brake for retarding the turning of the retarder shaft 40, and acting through the gear train contained in housing 34 to retard turning of the sheaves 13–13' incident to the pull on the cable 12 for drawing it out from the supply spool 10, thus to hold the cable taut and against any undesirable sag between its points of support 15 and 15'.

The two electric retarders 42–42' are shown in FIG. 4 to be mounted for driving on opposite end portions of the shaft 40. Each comprises a stator plate 44 that is rigidly fixed against rotation in a surrounding frame 45 that is bolted or otherwise fixed in an encircling housing 46 secured to or as a part of frame 26. Each stator plate 44 mounts coaxial, circularly arranged groups of electromagnets 47 thereon that are bolted back to back on its opposite faces. Central hubs 48 of each assembly provide support for antifriction bearings in which the end portions of the retarder drive shaft 40 are rotatably mounted. Rotatable with the shaft 40 at opposite sides of the stator plates 44, are paired iron plate rotors 49 located coaxial of the shaft 40 adjacent the outer ends of each of the groups of electromagnets 47.

The retarder sheaves 13–13' which are of substantial diameters, presently 84", are cast of aluminum on fixed alloy steel shafts 20—20 for their rotary support in the carrying frame and each sheave is fitted about its circumferential portion with removable rubber traction segments S which are grooved to form a succession of guiding channels for the cable 12 as wrapped thereabout in loops that extend between the two sheaves, as in FIG. 4. The number of loops made by the cable in its wrapping about the sheaves is immaterial but would be judged by the tension required.

For braking or retarding the turning of the sheaves 13–13' to resist paying out the cable, the operator of the vehicle initially energizes the stator coils with current that may be supplied from a storage battery 50. Eddy currents are then generated by the relative motion of rotors and stator that produce a magnetic field in the rotors. This tends to retard rotation of the rotors and shaft 40, and this retarding force on shaft 40 builds up through the train of gearing shown in FIG. 4 and is transferred back therethrough to the sheaves 13–13' to resist their turning for braking the outfeed of the transmission cable 12 thereover. The magnitude of the retarding torque in shaft 40 is directly proportioned to the speed of the rotors and the current supplied thereto. Energy absorbed by the two retarders is converted into heat which is dissipated from the rotors. Current flow to the stator coils is controlled by a four position switch 51 mounted at a point near to and readily accessable to the operator.

In lieu of the use of the electric retarders as designated by numerals 42–42', hydraulic retarders may be used. Such retarders are shown in FIG. 6 and are designated respectively in their entireties by numerals 60—60; these could be mounted in the frame structure of the retarder carrier frame 26 as are the retarders 42—42 previously described and would be driven in the same manner by being mounted at opposite ends of the cross-shaft 40. Each retarder comprises a housing in which an end portion of shaft 40 is rotatably contained. In each housing is an impeller that draws hydraulic medium from a tank 61 under valve control through pipe lines 62 and delivers it against baffle plates that are fixed in the housing to establish the resistance to the turning of the impellers; the hydraulic medium flow being returned to tank 61 through pipe connections 63. The resistance to the driving of shaft 40 acts through the gear train, as in the previous description, to retard the paying out of the transmission line 12 under the tensioning pull of the power device.

It is also a feature that in the use of either the electrical or hydraulic retarders, a hand brake as shown at 65 in FIG. 4 is employed to apply and secure initial tension through the sheaves 13–13'. Also, in each, the unit is equipped with the disengaging clutch 32 to allow the reels 13–13' to rotate freely in the preliminary stringing operation while geared together.

I claim:
1. Apparatus for stringing aerial transmission cable, or the like, across and between a succession of substantially spaced cable supports; said apparatus comprising cable restraining means adapted to be positioned between the supply of cable and the first of said succession of supports, whereby said cable is subjected, under the drawing out and stringing pull of a powered means, to a sag resisting tension throughout the length thereof that is between said restraining means and said powered means, said cable restraining means comprising at least one rotatable tensioning sheave adapted to have cable wrapped therearound, a tensioning sheave gear mounted coaxially of said tensioning sheave and adapted to rotate therewith, a retarder means for restraining the turning of said tensioning sheave under drawing out cable pull, and disengaging clutch means associated with said tensioning sheave gear and with said retarder means and adapted to be shifted into driving connection for restraining the turning of said tensioning sheave and shifted out of driving connection to permit free wheeling of said tensioning sheave.

2. Apparatus according to claim 1 including a pinion gear rotatably mounted in driving mesh with said tensioning sheave gear; and wherein said disengaging clutch means is adapted to be shifted into and from driving connection with said pinion gear.

3. Apparatus for stringing aerial transmission cable, or the like, across and between a succession of substantially spaced cable supports, said apparatus comprising cable restraining means adapted to be positioned between a supply of cable and the first of said succession of supports whereby said cable is subjected, under the drawing out and stringing pull of a powered means, to a sag resisting tension throughout the length thereof that is between said restraining means and said powered means, said cable restraining means comprising at least one rotatable tensioning sheave adapted to have cable wrapped therearound; and a retarder means for restraining the turning of said tensioning sheave under drawing out cable pull, the retarder means comprising an electrically activated apparatus in driving connection with the tensioning sheave, and clutch means associated with said tensioning sheave and with said retarder means and adapted to be shifted into driving connection for restraining the turning of said tensioning sheave and shifted out of driving connection to permit free wheeling of said tensioning sheave.

4. Apparatus according to claim 3 wherein the retarder means includes a pair of electrical retarders with a drive shaft common to both and including an upgeared driving connection between said drive shaft and the tensioning sheave.

5. Apparatus according to claim 3 wherein a pair of tensioning sheaves have a geared connection for rotating the tensioning sheaves in unison and including a hand brake operable for applying and regulating an initial retarding force to the cable tensioning sheaves through said geared connection independently of the retarder means.

6. Mobile apparatus for drawing aerial transmission cable or the like from a source of supply and for stringing it across and between a succession of cable supports, a cable restraining unit positioned between the source of supply of cable and the nearest of said points of cable support; said unit comprising a wheeled carrier vehicle with a pair of tensioning sheaves rotatably mounted thereon and about which paired sheaves said cable, as drawn from said supply, is wrapped in a succession of loops, thus to cause them to turn in unison with the drawing out of the cable, said tensioning sheaves having removably mounted segmental friction blocks fixed thereon which are multiple grooved and said sheaves have ring gears fixed coaxially thereon to turn therewith, a drive shaft extended between said reels and upgeared with said ring gears for driving said shaft to cause the sheaves to turn in unison in the same direction, a pair of electric retarders driven through said upgeared shaft and operable back through said geared driving connection to transmit retarding force to said pair of sheaves to apply tension to said cable.

7. Apparatus according to claim 6 wherein a hand brake is mounted on and is operable to apply a regulated retarding force to the tensioning reels independently of said retarder means, and wherein a releasable clutch is interposed in the driving connection between the drive shaft and retarders.

References Cited

UNITED STATES PATENTS

| | | | |
|---|---|---|---|
| 2,251,209 | 7/1941 | Revel | 242—148 |
| 2,485,757 | 10/1949 | Michel | 242—75.4 |
| 2,655,653 | 10/1953 | Chauvin | 254—134.3 |
| 2,703,218 | 3/1955 | Haskell et al. | 254—134.3 |
| 3,037,720 | 6/1962 | Leithiser | 254—134.3 |
| 3,054,572 | 9/1962 | Williams et al. | 242—86.7 |

OTHELL M. SIMPSON, *Primary Examiner.*